Feb. 1, 1938.  W. F. OLIVER  2,106,758
FLUID PRESSURE BRAKE SYSTEM
Filed Feb. 28, 1934  3 Sheets-Sheet 1

INVENTOR.
WALLACE F. OLIVER
BY Williams, Bradbury,
McCalet & Hinkle. ATTORNEYS

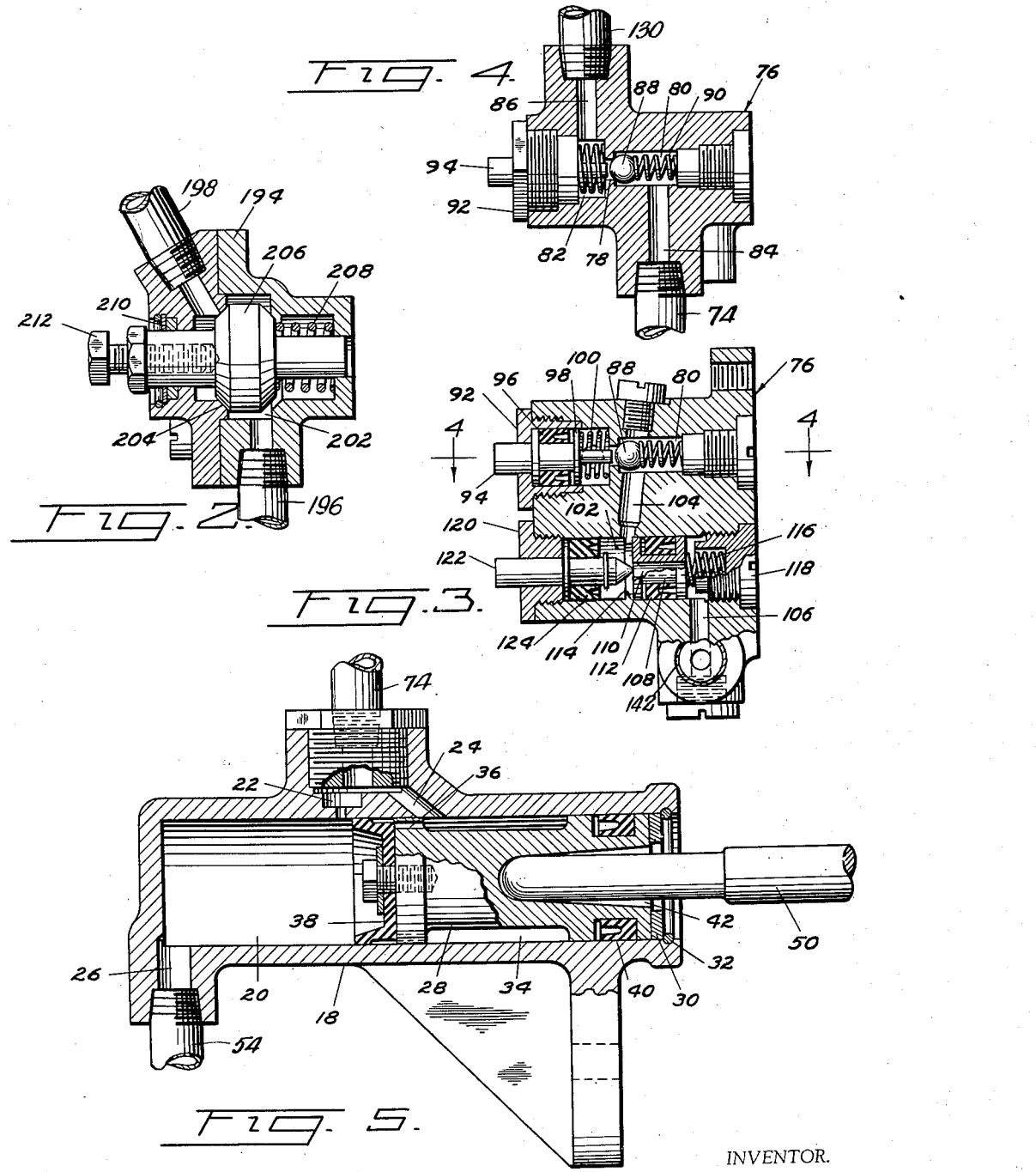

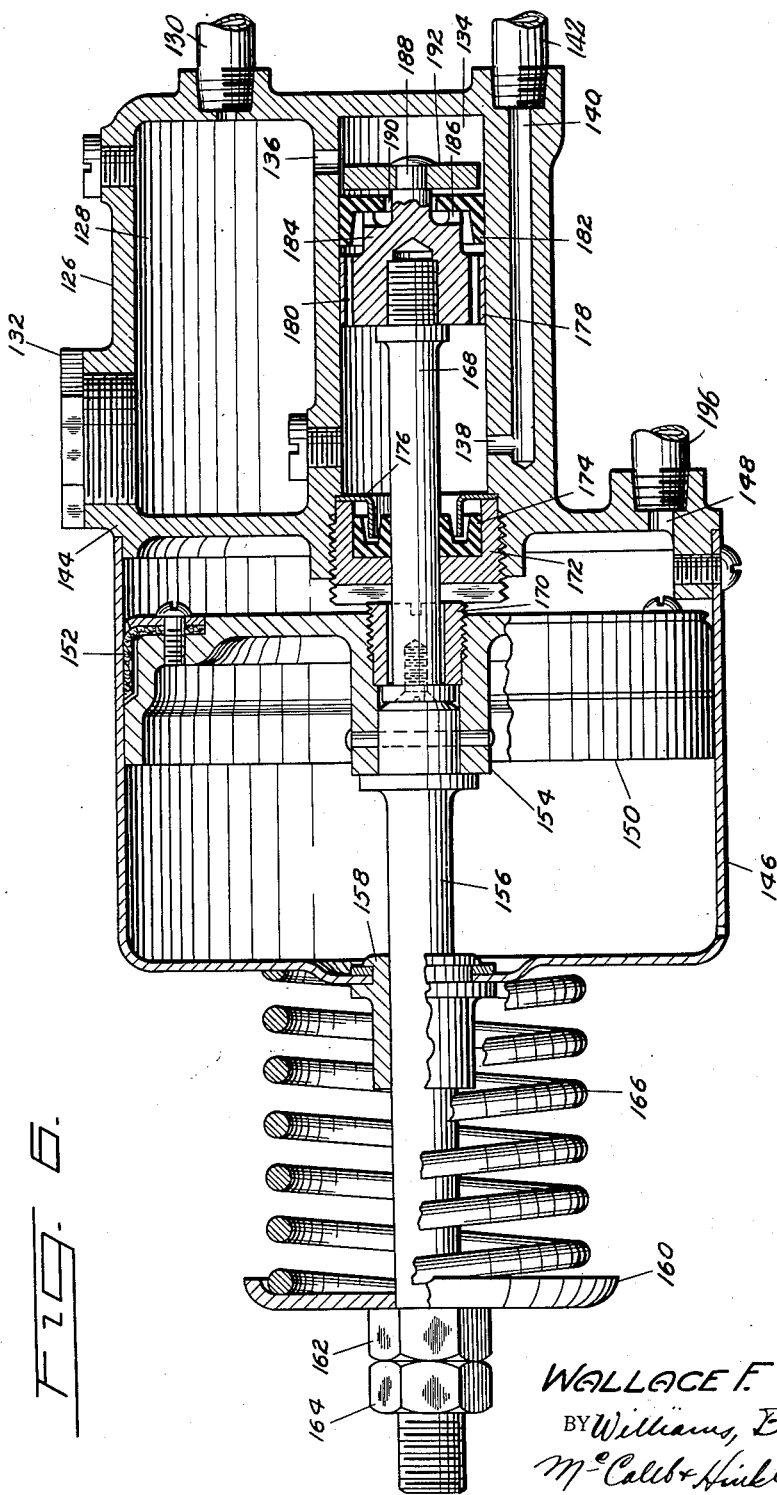

Patented Feb. 1, 1938

2,106,758

UNITED STATES PATENT OFFICE 2,106,758

FLUID PRESSURE BRAKE SYSTEM

Wallace F. Oliver, Detroit, Mich., assignor to Hydraulic Brake Company, Detroit, Mich., a corporation of California Application February 28, 1934, Serial No. 713,259

10 Claims. (Cl. 188—152)

This invention relates to fluid pressure brake systems and more particularly to devices for creating an initial pressure in the system.

It has been found that in the operation of fluid brake systems a considerable movement of the brake pedal lever is necessary in order to take up the clearance between the friction elements and the drum of the brake, and lost motion due to play between the mechanically interconnected parts of the mechanism. The present invention aims to overcome these objections.

An object of the invention is to provide means for automatically taking up slack in a brake system and for moving the friction elements into engagement with the drums.

Another object of the invention is to provide means automatically operated to introduce an initial pressure in the system upon the initial movement of the foot pedal lever from its normal position.

A further object of the invention is to provide a fluid brake system including means automatically operated by power supplied from the prime mover of the vehicle and effective to introduce an initial pressure in the system upon the initial movement of the foot pedal lever tending to apply the brakes.

Other objects and advantages of the invention will appear from the following description taken in conjunction with the accompanying drawings in which,—

Figure 2 is an enlarged sectional view of one of the valves included in the system;

Figure 3 is an enlarged sectional view of a duplex valve included in the system.

Figure 4 is a sectional view substantially on line 4—4, Figure 3;

Figure 5 is a longitudinal sectional view of a primary compression device included in the system; and Figure 6 is a longitudinal sectional view of a secondary compression device also included in the system.

Figure 1:
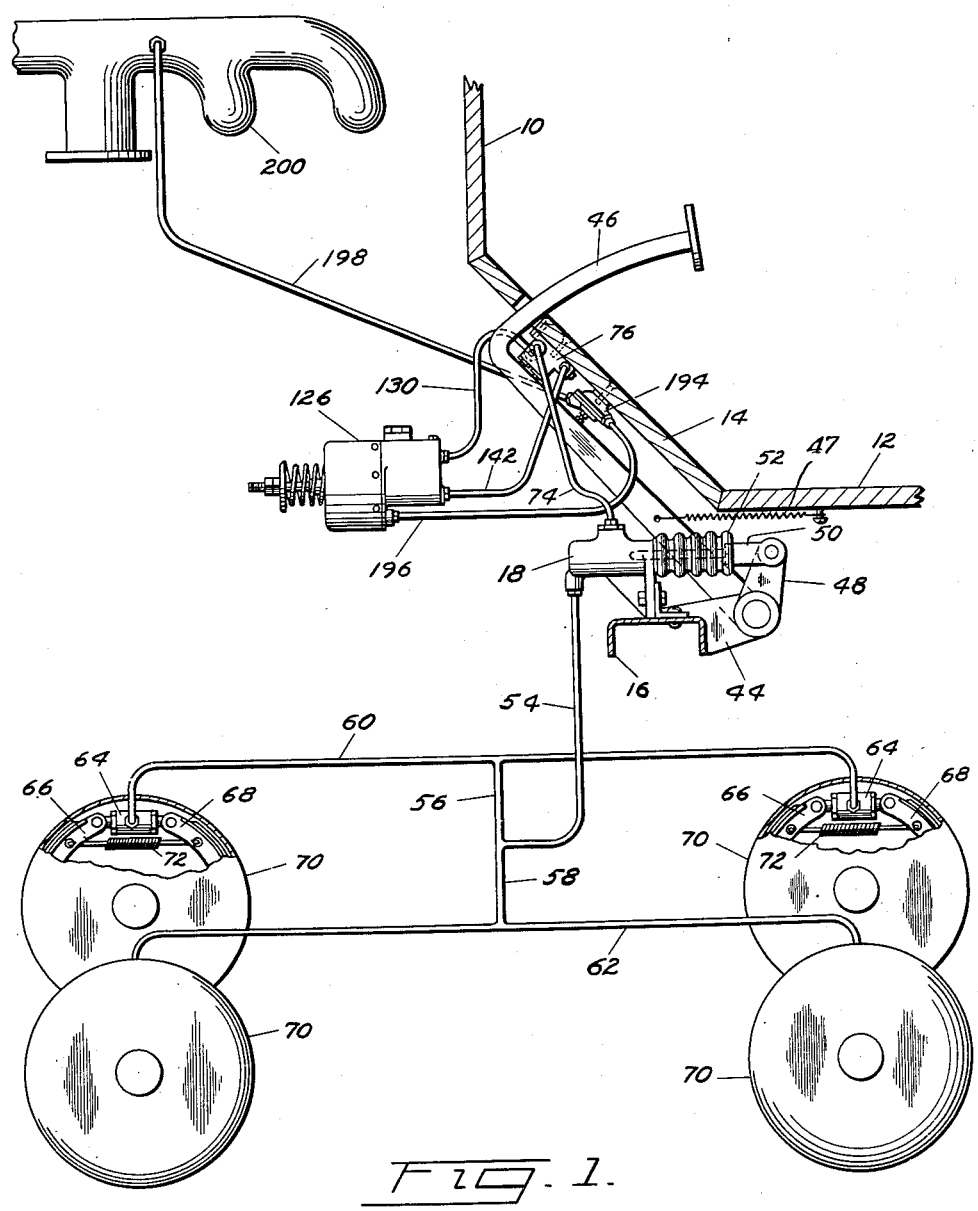
Figure 1 is a diagrammatical illustration of a motor vehicle equipped with a hydraulic brake system embodying the invention.

Referring to the drawings for more specific details of the invention, 10 represents the body of a motor vehicle including floor boards 12 and a foot board 14. A cross-member 16 of a chassis frame positioned beneath the body has suitably secured thereto a primary compression device 18 including a cylinder 20 provided with inlet ports 22 and 24 and an outlet or discharge port 26.

A reciprocable piston 28 in the cylinder is retained against displacement by a washer 30 seated on a ring 32 fitted in a circumferential groove in the wall of the cylinder. This piston has a body portion reduced in cross-section providing, in conjunction with the wall of the cylinder 20, a chamber 34 communicating with the port 24, and the head of the cylinder has a plurality of openings 36 providing communications between the chamber 34 and that portion of the cylinder chamber forward of the piston, and suitably secured on the head of the piston is a collapsible leak-proof cup 38. The skirt of the piston has a circumferential groove in which is fitted a leak-proof washer 40, and formed in the back of the piston is a recess 42.

A bracket 44 on the cross-member 16 has pivoted thereto a foot pedal lever 46 extending through the foot board 14 and held in its normal position by a retractor spring 47. This lever has an arm 48 to which is pivotally connected a thrust pin 50, the free end of which is received by the recess 42 in the back of the piston, and a dust shield or boot 52 is connected between the thrust pin and the open end of the cylinder.

The outlet or discharge port 26 of the cylinder 20 communicates with a conduit 54 having branch conduits 56 and 58 communicating respectively with conduits 60 and 62, the respective ends of which are connected to motor cylinders 64. These cylinders may be of any conventional type and each of these cylinders is connected between the respective ends of frictional elements 66 and 68 adaptable for cooperation with a rotatable drum 70 which may be suitably secured to a wheel, not shown, and connected between the separable ends of the friction elements are retractor springs 72 for returning and retaining the friction elements in retracted position.

The inlet ports 22 and 24 of the cylinder 20 are connected by conduits 74 to a duplex valve 76 suitably secured on the foot board 14 in the path of the foot pedal lever 46. This valve includes a chamber divided by a diaphragm including a valve seat 78 into two compartments 80 and 82. The compartment 80 has a port 84 communicating with the conduit 74, and the compartment 82 has a port 86, the purpose of which will hereinafter appear.

The compartment 80 has therein a ball valve 88 urged against its seat 78 by a coil spring 90, and the compartment 82 has threaded therein a cup 92 in which is mounted a plunger 94 for actuating the valve 88. As shown, the plunger 94 has thereon a leak-proof cup 96, a sleeve or collar 98, and a coil spring 100 interposed between the collar and the valve seat.

Arranged in parallel relation to the compartments 80 and 82 is a valve chamber 102 having a port 104 providing a communication between the compartment 80 and the chamber 102 and a port 106, the purpose of which will hereinafter appear. The chamber 102 has therein a slide valve 108 having an axial passage 110, and spaced circumferential flanges between which is fitted a leak-proof cup 112. This valve is urged to seat on a shoulder 114 in the chamber by a spring 116 interposed between the valve and the plug 118 threaded in one end of the chamber, and threaded in the other end of the chamber is a plug 120 having mounted therein a plunger 122 provided with spaced circumferential flanges between which is fitted a leak-proof cup 124, and a frustro-conical head adapted to control the passage 110 in the slide valve 108. The valve 108 normally prevents communication between the cylinders 20 and 134.

A secondary compression device 126 includes a reservoir 128 connected by a conduit 130 to the port 86 of the duplex valve 76. This reservoir has a filling opening closed as by a plug 132 which may be provided with a vent, and formed in the bottom of the reservoir is a cylinder 134 having a port 136 adjacent one end thereof providing a communication between the reservoir and the cylinder, and a port 138 adjacent its other end communicating with the passage 140 connected by a conduit 142 to the port 106 of the duplex valve 76.

An annular shoulder 144 on one end of the reservoir concentric to the cylinder 134 supports a cylinder 146. This cylinder is provided with a port 148, the purpose of which will hereinafter appear. A reciprocable piston 150 in the cylinder 146 has a sealing ring 152 and a sleeve or collar 154. A rod 156 is suitably secured in the sleeve or collar. This rod extends through a bushing 158 secured in the head of the cylinder 146, and has thereon a collar 160 held against displacement by a nut 162 secured in position by a lock nut 164, and sleeved on the rod between the cylinder 146 and the collar 160 is a coil spring 166 for actuating the piston.

A rod 168, suitably secured in the sleeve 154 as by a thimble 170 threaded in the sleeve, extends through a packing box 172 into the cylinders 134. The packing box is threaded in the open end of the cylinder 134, and has therein a leak-proof cup 174 held against displacement by a collar 176 clamped between the packing box and the wall of the cylinder.

A piston 178 in the cylinder 134 is suitably secured to the rod 168. This piston has a plurality of openings 180 providing communications between the respective ends of the cylinder, and a leak-proof cup 182 on the piston controls the opening. As shown, the piston 178 has a concentric portion 184 providing a seat for the cup on the retracted stroke of the piston, and the portion 184 is slotted to provide passages 186, and a concentric pin 188 on the piston extends through an axial opening in the cup with substantial clearance as at 190, and a disk 192 secured on the pin provides a seat for the cup during the compression stroke of the piston. The passage 186 and the clearance 190 provide for the circulation of fluid past the cup 182 when the piston moves to its retracted position.

A valve 194 positioned on the foot board 14 in the path of the foot pedal lever 46 is connected by a conduit 196 to the port 148 in the cylinder 146 and by a conduit 198 to the intake manifold 200 of the prime mover. This valve includes a valve chamber 202 having therein a valve seat 204 and a valve 206 urged against the seat by a coil spring 208. The stem of the valve 206 extends through a suitable packing box 210, and an adjusting bolt 212 threaded in the end of the stem is arranged for engagement with the foot pedal lever when this lever is in retracted position.

Assuming that the system is filled with suitable fluid, upon the initial movement of the foot pedal lever 46 to apply the brakes, the valve 206 is released and actuated by the spring 208 to close the communication between the cylinder 146 and the intake manifold 200 of the prime mover, resulting in release of the piston 150 and actuation thereof by the spring 166.

This movement of the piston 150 is transmitted through the rod 168 to the piston 178 to move this piston on its compression stroke. Movement of the piston 178 on its compression stroke results in discharging fluid from the cylinder 134 through the port 138, passage 140, and conduit 142, into the duplex valve 76. This valve includes a ball valve 88 and a slide valve 108 arranged for successive operation by the foot pedal lever so that communication between the reservoir 128 and the cylinder 20 is closed prior to establishing communication between the cylinder 134 and the cylinder 20. The successive operation of the valves 88 and 108 is accomplished by making their respective plungers 94 and 122 of such relative lengths that they are engaged and disengaged by the pedal 46 in the proper sequence. On entering the duplex valve 76, the fluid passes through the slide valve 108 therein, and passage 104, through compartment 80 and port 84 and conduit 74 connected thereto, through the ports 22 and 24 into cylinder 20, and thence through conduit 54 and branch conduits 56, 58, 60 and 62 into the motor cylinders 64, resulting in actuation of these motors to spread the friction elements 66 and 68 into engagement with the drums 76 against the resistance of the retractor springs 72.

During this initial movement, the piston 28 has traveled sufficiently on its compression stroke to cover the port 22, and further movement of the piston 28 discharges fluid from the cylinder 20 through port 26, the conduit 50 connected thereto and branch conduits, 56, 58, 60 and 62 into the motor cylinders, resulting in further energizing these cylinders and thereby spreading the friction elements 66 and 68 into engagement with the drum 70 to effectively resist rotation of the drums.

Upon release of the foot pedal lever 46 it is returned to its retracted position by a conventional retractor spring, and as this lever returns to its retracted position it engages the adjustable bolt 212 in the stem of the valve 206 and opens this valve against the resistance of the spring 208. Opening of the valve 206 establishes communication between the cylinder 146 and the intake manifold 200 of the prime mover, resulting in evacuation of the cylinder 146. This causes movement of the piston 150 against the resistance of the spring 166, and this movement of the piston is transmitted to the piston 178 to move the piston 178 on its retracted stroke. As the piston 178 moves on its retracted stroke, fluid from the reservoir 128 passes the cup 182 and circulates through the passages 180 in the piston and into the cylinder 134 forward of the piston to completely fill that portion of the system including the port 138 and the conduit 142 up to the slide valve 108, which is closed by the foot pedal lever engaging and actuating the plunger 122 when the foot pedal lever is in retracted position.

Upon release of the foot pedal lever and its return to retracted position, the valve 88 is opened to establish communication between the reservoir 128 and the cylinder 20. Movement of the foot pedal lever to its normal position moves the thrust pin 50 resulting in releasing the piston 28, with the result that the piston 28 is moved to its retracted position by fluid returning from the motor cylinders 64 due to pressure imposed by the retractor springs 72 connected between the friction elements 66 and 68.

Upon complete return of the piston 28 to its retracted position, the port 22 is uncovered, whereupon further pressure in the cylinder 20 causes the cup 38 to return to static condition, and any further fluid returned to the cylinder 20 from the motor cylinder 68 is discharged from the cylinder 20 through the port 22 and conduit 74, valve 76 and conduit 130, into the reservoir 128.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure operated brake system for a motor vehicle having an internal combustion engine, comprising a reservoir for supplying fluid to the system, a primary means for producing pressure, a secondary means for producing pressure, means for actuating the secondary means including means connected to the intake manifold of the engine, a valve for controlling the actuating means, means for circulating fluid from the reservoir through the secondary means and back to the reservoir, a valve connected in the circulating means, and means for actuating the primary means including means for operating the valves successively.

2. A fluid pressure operated system comprising a primary means for producing pressure, a secondary means for producing pressure, a reservoir for supplying fluid to both pressure producing means, a valve connected between the primary and secondary pressure producing means and the reservoir operable to provide for circulation of fluid from the reservoir through the secondary pressure producing means and back to the reservoir.

3. A fluid pressure operated brake system for a motor vehicle having an internal combustion engine, comprising a primary means for producing pressure, a motor cylinder connected thereto, a brake element operated by the motor cylinder, a secondary means for producing pressure, a reservoir for supplying fluid to both pressure producing means, a conduit connected between the primary and secondary pressure producing means, a valve connected in the conduit, a conduit connecting the valve to the reservoir, a vacuum chamber, a spring-pressed piston therein connected to the secondary means, a conduit connecting the vacuum chamber to the intake manifold of the engine, a valve connected in the conduit, and means for actuating the primary means including means for actuating the valves.

4. A fluid pressure operated brake system for a motor vehicle having an internal combustion engine, comprising a primary means for producing pressure, motor cylinders connected thereto, brake elements operated thereby, a secondary means for producing pressure, a reservoir for supplying fluid to both pressure producing means, a valve connected between the primary means and the secondary means and between the primary means and the reservoir, a vacuum chamber, a spring actuated piston in the vacuum chamber, a valve connected between the vacuum chamber and the intake manifold of the engine, and an actuator for the primary means controlling the valves.

5. A fluid pressure operated system comprising a compression device including a reservoir, a cylinder having a port providing a communication between the reservoir and the cylinder and a discharge port, a reciprocable piston in the cylinder, a vacuum chamber, a piston reciprocable therein connected to the piston in the cylinder and having a rod extending through the head of the chamber, a collar on the rod, and a compression spring on the rod between the collar and the head of the chamber.

6. A fluid pressure operated system comprising a compression device including a reservoir, a cylinder in the bottom thereof having a port providing a communication between the reservoir and the cylinder and a discharge port, a piston reciprocable in the cylinder having openings in its head for circulation of fluid through the piston, a leak-proof cup on the piston for controlling the flow of fluid through the piston, a vacuum chamber arranged concentrically to the cylinder, a piston reciprocable therein, a rod connecting the piston in the chamber to the piston in the cylinder, a rod for the piston in the chamber extending through the head of the chamber, a collar on the rod, and a compression spring between the collar and the head of the chamber.

7. A fluid operated system comprising a compression device including a reservoir, a piston in the bottom thereof having a port providing a communication between the reservoir and the cylinder and a discharge port, a stuffing box secured in the open end of the cylinder, a piston reciprocable therein having openings in its head for circulation of fluid through the piston, a leak-proof cup on the piston for controlling the flow of fluid through the piston, a rod for the piston extending through the stuffing box, a vacuum chamber arranged concentrically to the piston, a piston reciprocable in the chamber, a member connecting the piston to the rod for the piston in the cylinder, a rod attached to the piston in the chamber extending through the head of the chamber, a collar thereon, and a compression spring between the collar and the head of the chamber.

8. A fluid operated brake system comprising a primary means for producing pressure, a secondary means for producing pressure, a reservoir for supplying fluid to both pressure producing means, and a valve mechanism separate from said primary pressure producing means connected in the system operable to close the communication between the reservoir and the primary means for producing pressure during operation of the secondary means for producing pressure.

9. A fluid operated brake system comprising a primary means for producing pressure, a secondary means for producing pressure, a separate source of force for actuating each means, a reservoir for supplying fluid to both pressure producing means, and a valve mechanism connected in the system operated to close the communication between the reservoir and the primary means and to establish communication between the primary and secondary pressure producing means.

10. A fluid operated brake system comprising a primary means for producing pressure, a secondary means for producing pressure, a reservoir, supplying fluid to both pressure producing means, motor cylinders connected to the primary means, brake elements operated thereby, an actuator for the primary means, an actuator for the secondary means, a valve mechanism connected in the system and controlled by the actuator for the primary means for successively closing the communication between the reservoir and the primary means and establishing communication between the secondary and primary means.

WALLACE F. OLIVER.